(12) United States Patent
Volz (10) Patent No.: US 7,557,472 B2
(45) Date of Patent: Jul. 7, 2009

(54) VALVE DRIVE FOR A GAS EXCHANGE VALVE

(75) Inventor: Peter Volz, Darmstadt (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 484 days.

(21) Appl. No.: 10/561,677

(22) PCT Filed: Jun. 16, 2004

(86) PCT No.: PCT/EP2004/051123

§ 371 (c)(1), (2), (4) Date: Jun. 21, 2006

(87) PCT Pub. No.: WO2004/113687

PCT Pub. Date: Dec. 29, 2004

(65) Prior Publication Data

US 2007/0199526 A1    Aug. 30, 2007

(30) Foreign Application Priority Data

Jun. 26, 2003  (DE) ............................... 103 28 807
Jan. 22, 2004  (DE) ....................... 10 2004 003 220

(51) Int. Cl.
*H02K 7/00* (2006.01)
(52) U.S. Cl. ..................................... 310/17; 123/90.11
(58) Field of Classification Search .................. 310/17, 310/12, 14, 23; 123/90.11
See application file for complete search history.

(56) References Cited

U.S. PATENT DOCUMENTS

| | | | | |
|---|---|---|---|---|
| 4,984,541 A | * | 1/1991 | Kawamura | 123/90.11 |
| 5,115,772 A | * | 5/1992 | Kawamura | 123/90.11 |
| 5,559,378 A | | 9/1996 | Oudet et al. | |
| 6,561,144 B1 | * | 5/2003 | Muraji | 123/90.11 |
| 2003/0111029 A1 | * | 6/2003 | Grundl et al. | 123/90.11 |
| 2006/0231783 A1 | * | 10/2006 | Volz | 251/129.11 |

FOREIGN PATENT DOCUMENTS

| | | |
|---|---|---|
| DE | 19906657 | 8/2000 |
| DE | 10125767 | 5/2002 |
| EP | 1045116 | 10/2000 |
| EP | 1215370 | 6/2002 |
| FR | 2818430 | 6/2002 |

OTHER PUBLICATIONS

Patent Abstracts of Japan, Publication No. 2002129921 A, date of publication May 9, 2002, Applicant: Hitachi Ltd.

* cited by examiner

*Primary Examiner*—Hae Moon Hyeon (57) ABSTRACT

Disclosed is a valved drive for a gas exchange valve (4) in a power engine, with a magnetic rotor (12) which, along with a rotor section positioned at a distance from the gas exchange valve (4), extends in a longitudinally movable manner inside a stator (1) provided with a current coil (18), so that one end of the rotor (12) projecting out from the stator (1) activates the gas exchange valve (11) upon the stimulation of the current coil (18). The rotor (12) is, in the area of the rotor section, preferably designed in accordance with the type of a flat-body slide valve as a vertiaclly moved rotor plate (11), in which several level individual magnetic parts (21) are aligned.

14 Claims, 6 Drawing Sheets

VALVE DRIVE FOR A GAS EXCHANGE VALVE

BACKGROUND OF INVENTION

The invention relates to a valve drive for a gas exchange valve in an engine.

A whole series of valve drives of the type stated is known from the patent literature. In this connection, reference is hereby made to DE 101 25 767 C1.

The basic principle of this valve drive, which is already known from this patent, is that a rotor rigidly connected with the gas exchange valve is moved along the common axis in the magnetic field of a stator.

In order to produce sufficiently high forces on the rotor in an economical manner, correspondingly strong magnetic fields are needed in the air gap between the stator and the rotor. For this purpose, the air gaps in the magnetic circuit must be as small as possible, and suitable current coils must be positioned on the stator, among other features.

Furthermore, the actuator, which consists of the stator and the rotor, must fit into the relatively small construction spaces that are available, such as the cylinder head of a motor vehicle internal combustion engine, for example, for which reason the current coils and the active air gap surfaces can not be constructed as large as desired. The magnetic losses in the magnetic circuit must be kept low. In addition, the current and voltage are limited, even in the on-board power system of motor vehicles.

In the complex geometries on the cylinder head of an internal combustion engine, very exacting geometric tolerances must be observed between the individual function elements, particularly between the rotor and the stator of the valve drive, in order to prevent a jamming or an excessively large air gap.

Moreover, asymmetrical magnetic fields in the air gap on the rotor lead to considerable transverse forces, which are reinforced and can lead to excessively great frictional forces, energy losses, and even to the jamming of the rotor that has already been mentioned.

Since considerable temperature differences have to be taken into account on all engine components during the heating and cooling phase, especially in the case of internal combustion engines, and thereby thermally-induced changes in geometry as well (in the case of components made from materials with different thermal expansions and sharply differing temperatures), the air gaps and clearances must, for thermal reasons, be kept sufficiently large, particularly in the valve drive.

Accelerations of up to 100 times acceleration due to gravity act on gas exchange valves. These lead to excessively large component clearances and, in the air gap of the magnetic circuit, to an undesirable development of noise, asymmetrical forces, and abrasion in the valve drive.

In addition, particles from abrasion, wear and dirt, which are sometimes even magnetic, are always present in an internal combustion engine. These particles can also collect in the magnetic gaps of the actuator and lead to the jamming of the valve drive.

The connection of a gas exchange valve with the valve drive represents a considerable technical manufacturing problem, both in a power engine or a processing engine. That is to say, because of the local and functional conditions, the inspectability, the assembly, and the disassembly of the gas exchange valve and of the valve drive in the cylinder head must be guaranteed independently of one another.

SUMMARY OF INVENTION

Thus, the task of the present invention is to improve a valve drive of the type stated above in such a manner that the above-stated requirements are fulfilled and the disadvantages noted are avoided.

In accordance with the invention, this task is solved for a valve drive of the type stated by means of the characterizing detailed below.

Additional characteristics, advantages, and possibilities of use of the invention emerge in the following from the subclaims and the description of examples of implementation in reference to several diagrams.

BRIEF DESCRIPTION OF THE DRAWINGS

These depict the following.

DETAILED DESCRIPTION OF THE DRAWINGS

Figure 1:
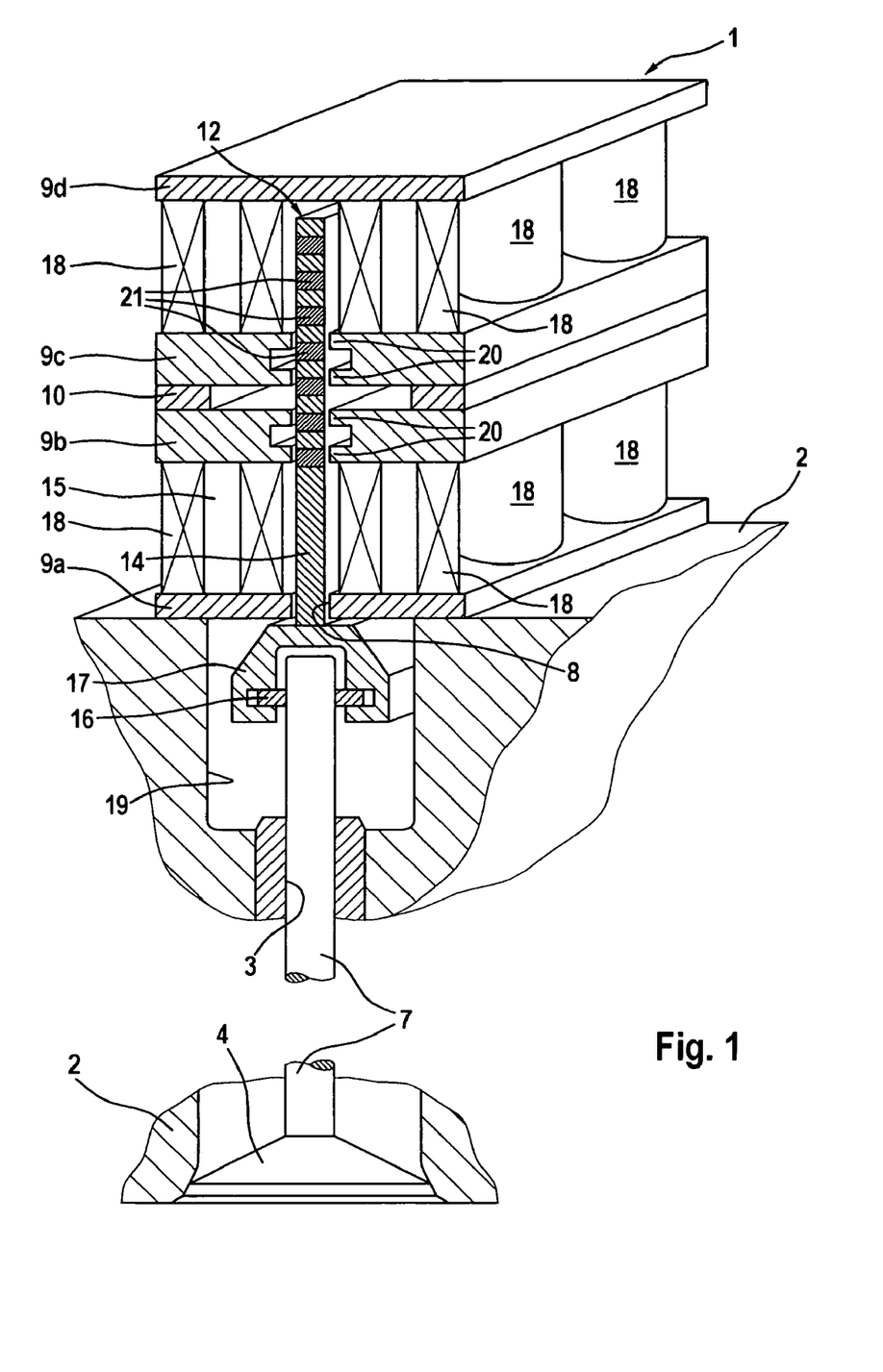
FIG. 1: A cross-section through a cylinder head, in which a valve drive in accordance with the invention is positioned.

FIG. 1 depicts the arrangement of a valve drive in a cylinder head 2 of an internal combustion engine for the purpose of the activation of a gas exchange valve 4 positioned on the intake side or the outlet side. The cylinder head 2, which is depicted in cross-section, has, for this purpose, a valve accommodation boring 3 for guiding and sealing off the gas exchange valve 4. The gas exchange valve 4 is designed as a disk valve, which is concentrically oriented, with its valve seat surface, towards the valve seat positioned in the intake or outlet channel.

An electromagnetic actuator is provided as a valve drive above the gas exchange valve 4 in the plane of the gas exchange valve, which is also depicted in cross-section in a perspective view, within the stator 1 of which an axially movable rotor 12 is positioned, which is connected detachably with the valve stem 7 of the gas exchange valve 4 by way of a coupling element 17. This valve drive, which is designed as a linear motor, guarantees a variable gas exchange in which the point in time of opening of the valve, the stroke of the valve, as well as the duration of opening of the gas exchange valve 4 can be adjusted as desired in dependence on the triggering of several current coils 18 positioned in parallel in the stator 1.

The rotor 12 forms, along with the stator 1, an independently operable structural component which is preferably functionally preinspectable, and is detachably connected with the gas exchange valve 4. The coupling element 17 positioned between the rotor 12 and the gas exchange valve 4, which produces a force-locking and/or form-locking connection between the rotor 12 and the gas exchange valve 4, is necessary for this purpose.

As is evident from FIG. 1, the stator 1 is coaxially oriented and attached to the rotor 12 and the coupling element 17 attached to the rotor 12, opposite the gas exchange valve 4 in the cylinder head 2. For the space-saving integration of the coupling element 17 between the valve accommodation boring 3 (valve stem guide of the gas exchange valve 4) and the support surface of the stator 1, a gradated boring 19 is provided in the cylinder head 2. An auxiliary spring can, if needed, be positioned between the coupling element 17 and the base of the gradated boring 19 in order, for the prevention of contact with the piston, to be able to securely close the gas exchange valve 4 again in the event of a failure of the current coils 18.

The rotor 12 is designed as a narrow rotor plate 11, into which several magnetic parts 21, which are concentrically positioned one above the other and which have an alternating magnetic orientation, are inserted. The magnetic parts 21 are positioned in a radial air gap in the tooth area 20 of the stator 1 positioned on both sides of the rotor plate 11, which has two teeth in the internal area of the stator plates 9b, 9c between the current coils 18, which teeth align with one another, are oriented towards the level magnetic parts 21, and are positioned linearly to the rotor plate 11. The arrangement selected guarantees, independently of the number of the teeth, that the magnetic parts 21 positioned in several rows in the rotor plate 11 always align, corresponding to their magnetic orientation, with the coordinated teeth of the stator plates 9b, 9c. The construction of the stator 1 described above provides a multiplicity of current coils 18 on both sides of the rotor plate 11 between the four stator plates 9a, 9b, 9c, 9d oriented transversely to the rotor plate 11, whereby the current coils 18 can advantageously also be triggered electrically, independently of one another.

The stator 1 is constructed in such a manner that two stator plates 9b, 9c, which are identical in construction and have their tooth areas 20 positioned one above the other, are always stacked in a manner aligning with one another and are separated from one another by means of spacers 10. The first stator plate 9a, which is supported on the cylinder head 2 as a base plate and forms the ground frame, is distinguished from the three other stator plates 9b, 9c, 9d placed above it by its vertical bushing 8 for the rotor 12, which is slot-shaped in cross-section, the rotor plate 11 of which extends into the tooth area 20 of both stator plates 9b, 9c, which function as pole shoes. Above the rotor 12 and the current coil 18, the fourth stator plate 9d forms, to a certain extent, the closing frame of the stator 1.

FIG. 1 consequently depicts a valve drive for a gas exchange valve in a power engine or processing engine, the magnetic rotor 12 of which, along with a rotor section placed at a distance from the gas exchange valve, extends in a longitudinally movable manner inside a bushing 8 of a stator 1 provided with several current coils 18. In accordance with the invention, the rotor 12 is designed, in the area of the rotor section, as a rotor plate 11 moved vertically in the stator 1, preferably in the manner of a flat-body slide valve, within which several magnetic parts 21 are oriented in several planes.

At least one bushing 8 adjusted to the cross-sectional contour of the rotor plate 11, through which a rotor bar 14 connecting the rotor plate 11 with the coupling element 17 extends, is provided in the base area of the stator 1, which is oriented to the gas exchange valve 4. The base area of the stator 1 is designed particularly simply, in terms of production technology, as a rectangular and level first stator plate 9a, which has the bushing 8 for the rotor bar 14 positioned centrally on its longitudinal axis. On both sides of the bushing 8, the necessary current coils 18, onto which the second level stator plate (9b) is applied, can be arranged particularly simply in successive rows on the first stator plate 9a, which has at least one second bushing 8 in the tooth area (20) aligning with the first bushing 8, which is adjusted to the cross-section of the rotor plate 11. Above the side of the second stator plate 9b oriented away from the current coils 18, the third stator plate 9c, which is constructed identically with the second stator plate 9b, is positioned aligning with the second stator plate 9b. The third stator plate 9c is separated from the second stator plate (9b) by at least one pair of non-magnetic spacers 10. On the third stator plate 9c, several current coils 18 are, in a manner analogous to the current coils 18 positioned below the second stator plate 9b, likewise placed in a series on both sides of the rotor plate 11, to which the fourth stator plate 9d is fixed. Each current coil 18 is penetrated by a rod-shaped magnetic core 15 which, for the closing of the magnetic circuit with its ends, contacts the stator plates 9a, 9b or 9c, 9d, respectively, corresponding to the current coils 18.

Figure 2:
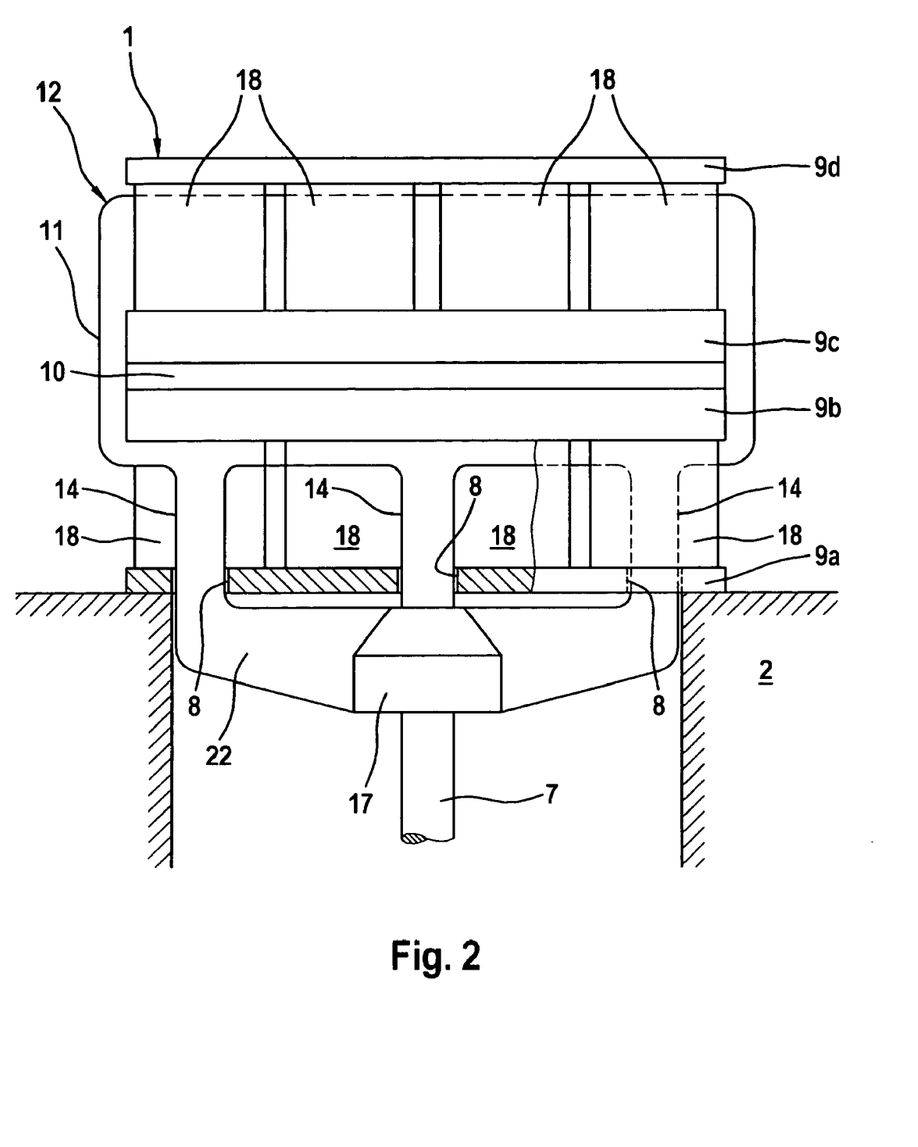
FIG. 2: A lateral view of the valve drive in accordance with the invention depicted in FIG. 1.

FIG. 2 presents a lateral view of the valve drive depicted in FIG. 1, from which it is evident that the first stator plate 9a is, in the present example of implementation, provided with three bushings 8, which are adjusted to the contour of the three rotor bars 14 in a manner corresponding to the clearance. The rotor bars 14 projecting through the bushings 8 are, at approximately the level of the second stator plate 9b, brought together, over a full surface, to the area of the rotor plate 11 supporting the magnetic parts 21, the magnetic parts 21 of which are, in the lateral view in accordance with FIG. 2, hidden by the current coils 18, the second and third stator plate 9b, 9c, as well as by the spacers 10 located between the same. Below the first stator plate 9a, the rotor bars 14 are likewise brought together to a solid connecting section 22, which accommodates the coupling element 17.

Figure 3:
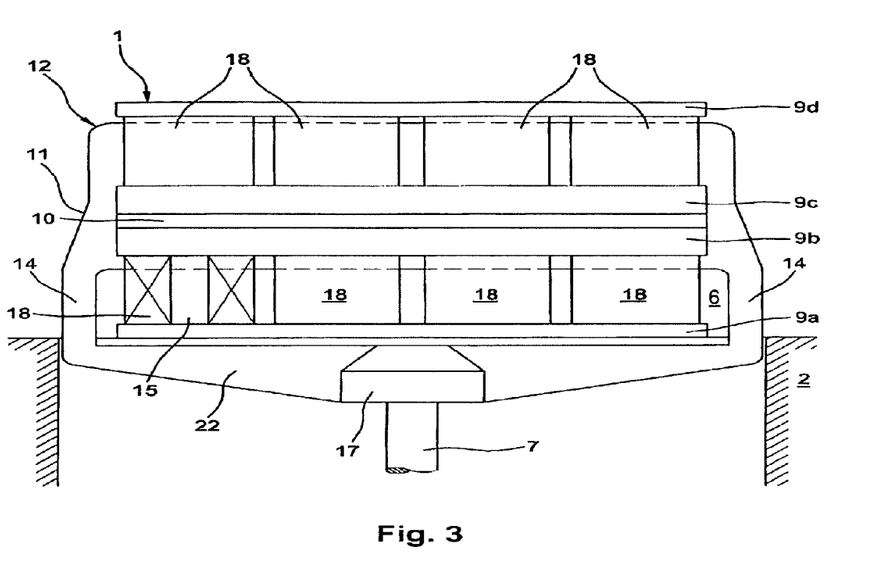
FIG. 3: An alternative configuration of the valve drive in accordance with the invention in the area of the rotor plate.

FIG. 3 depicts, in a manner diverging from FIG. 2, the rotor bars 14 integrally formed with both ends of the connecting sections 22, which encompass the first stator plate 9a in a manner corresponding to the clearance in the direction of the area of the rotor plate 11 that has the magnetic parts 21. The rotor plate 11 has an oblong slot 6 between the rotor bars 14. The oblong slot 6 accomodates the first stator plate 9a, adjusted to the length and thickness of the stator plate 9a in a manner corresponding to clearance. The clearance existing between the thickness of the stator plate 9a and the oblong slot 6 is as least as great as the work stroke of the rotor 12. This has the advantage that the bushings 8, which are known from FIGS. 1, 2, are not necessary in the first stator plate 9a. The construction of the valve drive in accordance with FIG. 3 otherwise corresponds to the previous details explained in FIGS. 1, 2.

Figure 4:
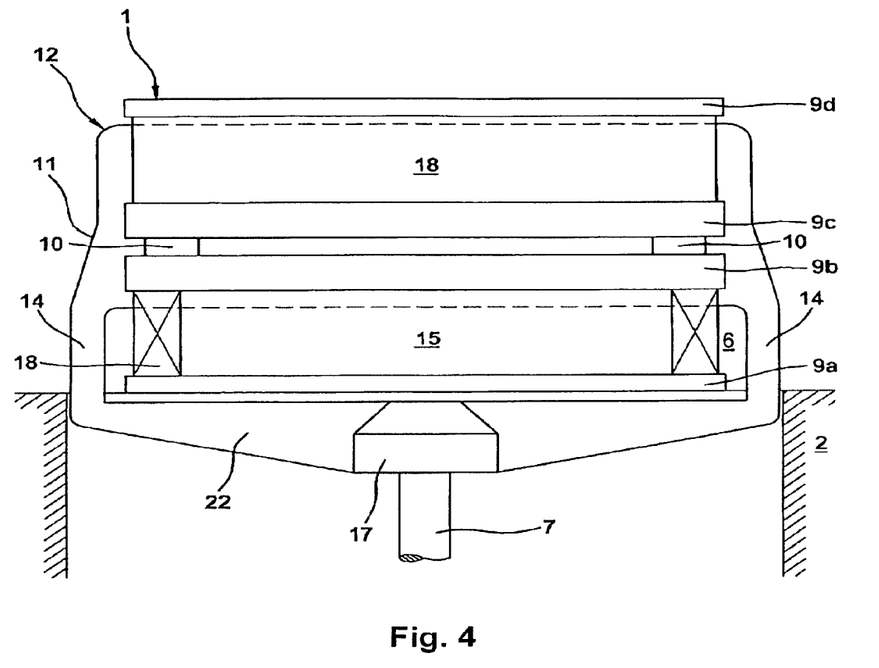
FIG. 4: An additional variant of configuration of the valve drive in accordance with the invention, in the area of the current coils.

FIG. 4, diverging from the previous explanations of the object of the invention, depicts, instead of the use of a multiplicity of cylindrical current coils 18 positioned next to one another, the use of only one pair of oval current coils 18 positioned one above the other on each side of the rotor plate, so that, instead of the rod-shaped magnetic cores in the cylindrical current coils 18, the magnetic cores 15, corresponding to the oval shape of the current coils 18, now fill up the intermediate space within each oval current coil 18.

Figure 5:
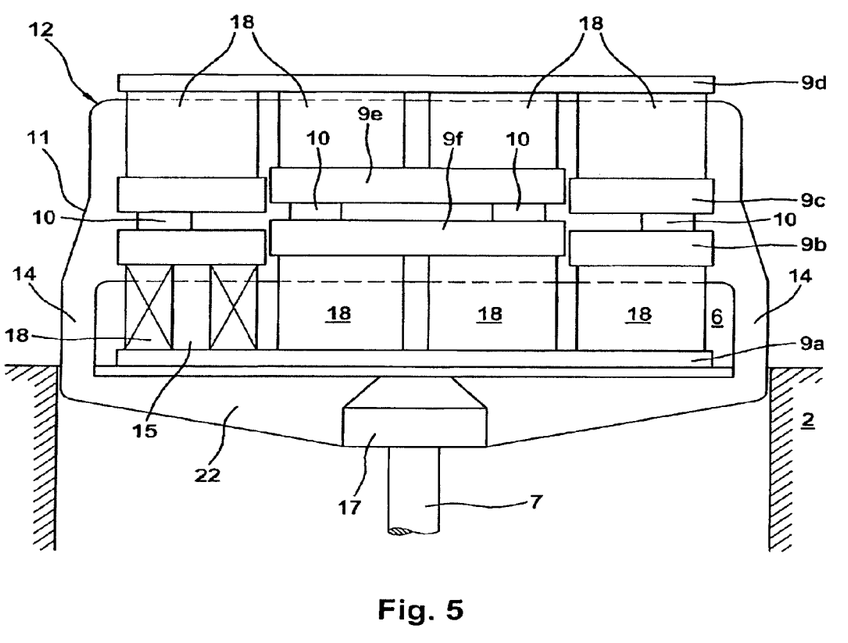
FIG. 5: A variant for the configuration of the stator plates of the valve drive in accordance with the invention.

As is evident from FIG. 5, the second and third stator plate 9b, 9c can, in the event of desire or need, be designed in a multi-part manner, and even displaced in their planes, so that multi-pole stator plates with relatively little space requirement can be produced.

Figure 6:
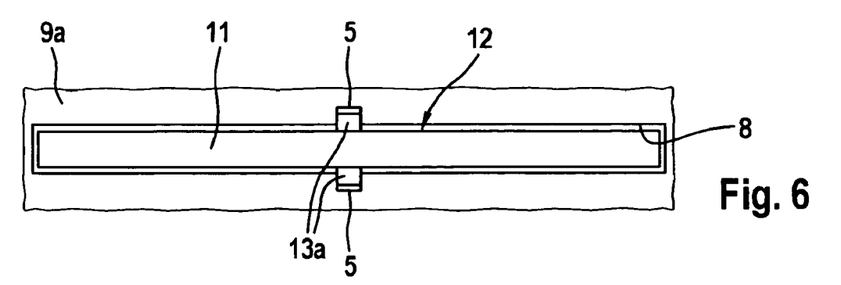
FIG. 6: A view from above of the rotor plate easily supported between a stator plate.

FIG. 6, starting from the basis of the descriptions to FIGS. 1 to 5, depicts a view from above of the first stator plate 9a forming the ground frame, which is supported on the cylinder head 2 as a base plate, which is only partially depicted in a rough manner in the present view in the area of its slot-shaped bushing 8. This stator plate 9a accommodates a pair of guide elements 13a over a partial span on both sides of the narrow rotor plate 11 depicted in the view from above, either directly on the rotor plate 11 or in the area of the rotor bar 14, which are inserted into grooves 5 of the stator plate 9a. A particularly simple but nevertheless precise and clamping-free guidance of the rotor 12 in the stator 1 is achieved by this means.

Figure 7:
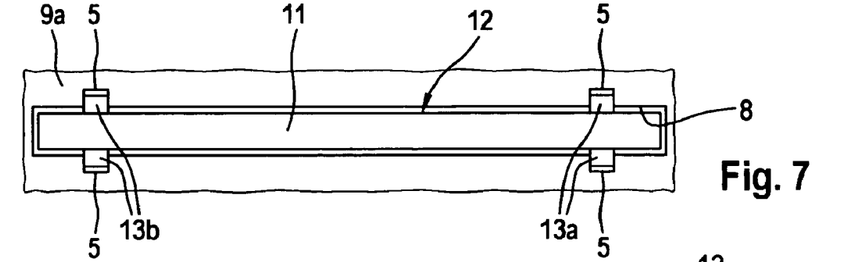
FIG. 7: A view from above of the rotor plate multiply supported between a stator plate.

FIG. 7, in contrast to FIG. 6, depicts a multiple supporting and guidance of the rotor 12 inside the bushing 8 of the first stator plate 9a, for which the guide elements 13a, 13b are, on both of the external sections of the rotor 12, positioned on both sides of the plate-shaped rotor 12 in grooves 5 of the stator plate 9a.

Figure 8:
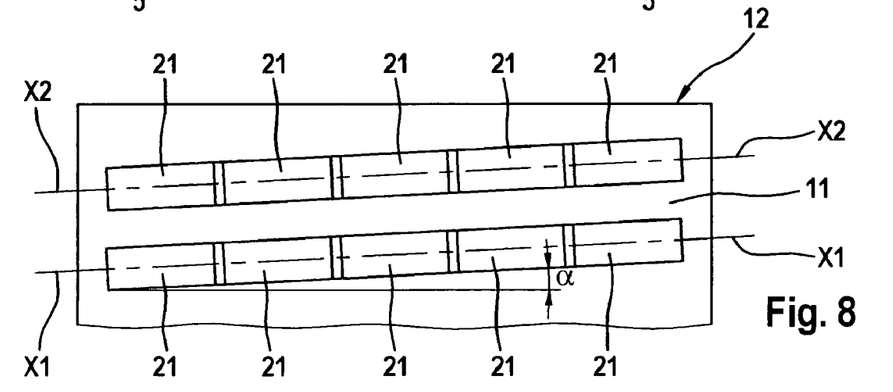
FIG. 8: A lateral view of the rotor plate in the area of the magnetic parts.

FIG. 8, in supplement to FIGS. 1 to 7, depicts in a lateral view the partially depicted rotor plate 11, with several magnetic parts 21 which are positioned in several series of magnets X1, X2 of the rotor plate 11 positioned in parallel, one above the other, whereby the series of magnets X1, X2 are inclined opposite to the horizontal orientation of the tooth area 20.

Figure 9:
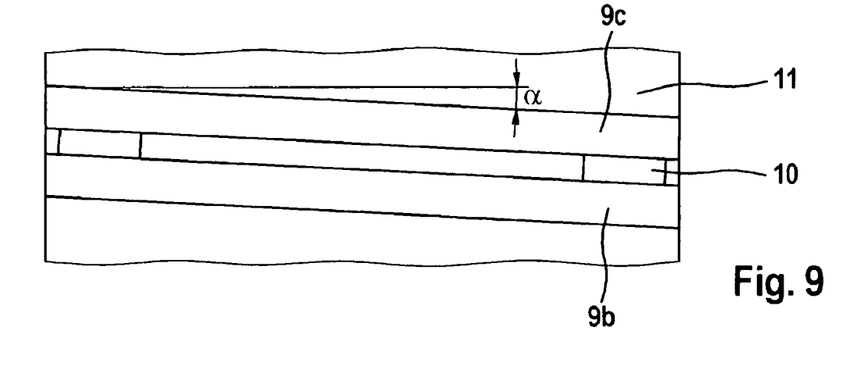
FIG. 9: A lateral view of two stator plates inclined relative to the magnetic parts of the rotor plate.

In an alternate manner to FIG. 8, the magnetic parts 21 are accommodated, in FIG. 9, horizontally in the rotor plate 11 in several series of magnets X1, X2 positioned in parallel one above the other, while the stator plates 9b, 9c provided with the tooth areas 20 are inclined opposite the series of magnets X1, X2.

The constructions proposed in FIGS. 7 and 8 improve the transition of the electromagnetic power flux during the relative motion of the rotor 12 in the stator 1, as the result of which a more efficient utilization of the magnetic force results.

In summary, the valve drive proposed in accordance with the invention is distinguished by the following characteristics:

1. Through the configuration of the rotor 12 in accordance with the type of a flat-body slide valve, an extremely narrow constructional width results for the valve drive, so that this can be integrated into every cylinder head without any problem.
2. The magnetic circuit can be optimally adjusted to the performance requirements of the valve drive through the fact that the number, the construction, and the electrical triggering of the current coils 18 can be varied in a simple construction and in accordance with preference. Through the simple geometry of the stator, which is brought about through the use of the stator plates 9a-d presented, among other ways, not only cylindrical, but also oval current coils 18 can be used. Upon the use of several cylindrical current coils 18, a particularly small diameter of coil can be achieved, so that the expenditure for copper, as well as the influence on the level of efficiency in the current circuit that is connected with the same, is minimal. The actuator can consequently be operated with a lower electrical voltage. The current coils can, depending on the characteristic operating curve that is desired, each be flowed through by electrical current in parallel, in series, or in sequence, through which the possibility exists for the recovery of electrical energy from the electrical motor power specifically prevailing within the magnetic circuit. Furthermore, only a slight dispersion of the magnetic field results.
3. A good cooling of the coil, and a particularly simple mounting as well as dismounting of the current coils 18, results from the fact that the current coils 18 are positioned exclusively on the side of the rotor 12.
4. A guidance of the rotor 12 independently of thermally-induced changes in geometry results, whereby thermal expansions between the rotor 12 and the stator 1 have no influence on the guidance. Through the use of guide elements 13a, 13b that is hereby proposed, the rotor 12 is guided securely and supported against the high magnetic transverse forces acting there, even in a critical area of air gap, as well as against transverse acceleration forces. The number of guide elements that is thereby used can vary between two and a multiple thereof.

The invention proposed consequently guarantees:
Economic manufacturing tolerances;
Economic mounting and automatic adjustment of the valve drive;
Low losses in the magnetic circuit;
High efficiency, since the valve drive is optimally adjustable and has only low frictional forces;
Thermally stable operation of the valve drive, even during the run-up phase and the cooling phase of the engine;
Simple workshop service.

List of references

1 Stator
2 Cylinder head
3 Valve accommodation boring
4 Gas exchange valve
5 Groove
6 Oblong slot
7 Valve stem
8 Bushing
9a-d Stator plate
10 Spacer
11 Rotor plate
12 Rotor
13a Guide element
13b Guide element
14 Rotor bar
15 Magnetic core
16 Clamping ring
17 Coupling element
18 Current coil
19 Gradated boring
20 Tooth area
21 Magnetic part
22 Connecting section

The invention claimed is:

1. A valve drive for a gas exchange valve in an engine comprising:
a magnetic rotor:
a rotor section rositioned at a distance from the gas exchange valve, extends in a longitudinally movable manner inside a bushing of a stator provided with a current coil, the stator has a tooth area forming a magnetic frame, and one end of the rotor projects out from the stator in a direction of the gas exchange valve, and upon the excitation of the current coil, the rotor activates the gas exchange valve, wherein the rotor (12) is a flat-body slide valve and located in an area of the rotor section and constructed in the stator (1) as a vertically moved rotor plate (11) in which several magnetic rarts (21) are oriented, in several planes and a base area of the stator (1) is oriented towards the gas exchange valve (4), at least one bushing (8) is adjusted to the cross-sectional contour of the rotor plate (11), and through the bushing at least one rotor bar (14) connects the rotor plate (11) with a coupling element (17).

2. The valve drive according to claim 1, wherein the base area of the stator (1) is designed as a rectangular, level first stator plate (9a), which has the bushing (8) for the rotor bar (14) on a center of its longitudinal axis.

3. The valve drive according to claim 2, wherein on both sides of the bushing (8), at least one pair of current coils (18) is positioned on a first stator plate (9a), and at least one pair of current coils a second level stator plate (9b) is applied, the second level stator plate has at least one second bushing (8) that is equivalent to the first bushing (8) and aligned therewith, and having a tooth area (20) positioned on both sides of the second stator plate (9b).

4. The valve drive according to claim 3, wherein above a side of the second stator plate (9b) oriented away from the current coils (18), a third stator plate (9c) is positioned, which is separated from the second stator plate (9b) by at least one pair of spacers (10).

5. The valve drive according to claim 4, wherein a bushing having a tooth area (20) is provided in the third stator plate (9c), and the bushing is oriented to align with the first and the second bushings.

6. The valve drive according to claim 4, wherein at least one pair of current coils (18) is placed on the third stator plate (9c), and on the pair of coils an end plate (9d) forming the second end area of the stator (1) is placed.

7. The valve drive according to claim 1 wherein in the area of the bushing (8), at least one pair of guide elements (13a, 13b) is positioned in one of the stator plates (9a-9c), and the pair of guide elements fit closely on both sides of the rotor plate (11) and orient the rotor (12) into the bushings (8) in a clamping-free manner.

8. The valve drive according to claim 7, wherein the guide elements (13a, 13b) are inserted into grooves (5) of the stator plate (9a, 9b, 9c). or into grooves of the rotor plate (11).

9. The valve drive according to claim 7, wherein the guide elements (13a, 13b) are inserted into grooves (5) into grooves of the rotor plate (11).

10. The valve drive according to claim 2, wherein the current coil is penetrated by a rod-shaped magnetic core (15) which, for the closing of the magnetic circuit with its ends, contacts stator plates. 9c) corresponding to the current coil.

11. The valve drive according to claim 2, wherein two or more magnetic parts (21) are positioned in several series of magnets (X1, X2) in the rotor plate (11) positioned in parallel one above the other, whereby the series of magnets (X1, X2) are inclined opposite to the horizontal orientation of the tooth area (20).

12. The valve drive according to claim 2, wherein several magnetic parts (21) in the rotor plate (11) are accommodated in several series of magnets (X1, X2) positioned in parallel, one above the other, whereby the series of magnets (X1, X2) are oriented horizontally in the rotor plate (11), while at least one pair of stator plates (9b, 9c) provided with tooth areas (20) is inclined opposite the series of magnets (X1, X2).

13. The valve drive according to claim 2, wherein the rotor plate (11) has an oblong slot (6) between two rotor bars (14), the oblong slot accommodates a first stator plate (9a) corresponding to the stator (1), adjusted to the length and the thickness of the stator plate (9a) in a manner corresponding to clearance.

14. The valve drive according to claim 13, wherein the clearance existing between the thickness of the stator plate (9a) and the oblong slot (6) is at least as great as the work stroke of the rotor (12).

* * * * *